`United States Patent` [19]

Ratjen

[11] 4,303,687

[45] Dec. 1, 1981

[54] TREATMENT OF BAKERY PRODUCTS TO BE STORED IN THE DEEP FROZEN STATE

[76] Inventor: Werner Ratjen, Freeweid 12-14, 2302 Flintbek, Fed. Rep. of Germany

[21] Appl. No.: 105,596

[22] Filed: Dec. 20, 1979

[30] Foreign Application Priority Data

Dec. 27, 1978 [DE]  Fed. Rep. of Germany ....... 2856272

[51] Int. Cl.³ .................... A21D 13/00; A21D 15/00; A23L 3/36
[52] U.S. Cl. .................................. 426/497; 426/281; 426/653; 426/524; 426/549
[58] Field of Search ............... 426/281, 549, 496, 327, 426/524, 653, 497, 506, 510, 511

[56] References Cited

U.S. PATENT DOCUMENTS

| | | | |
|---|---|---|---|
| 1,181,317 | 5/1916 | Katz | 426/506 |
| 3,821,441 | 6/1974 | Tomita et al. | 426/524 |
| 3,830,948 | 8/1974 | Fischer et al. | 426/281 |

FOREIGN PATENT DOCUMENTS 1090603  3/1957  Fed. Rep. of Germany ...... 426/549

OTHER PUBLICATIONS

Tressler; D. K. et al., *The Freezing Preservation of Foods,* vol. 4, AVI Publishing Co., Inc., 1968, pp. 386–459.
Simpson; J. I., *The Frozen Food Cookbook,* AVI Publishing Company, Inc., 1962, pp. 166–177.

*Primary Examiner*—Joseph M. Golian
*Assistant Examiner*—Elizabeth J. Curtin
*Attorney, Agent, or Firm*—Balogh, Osann, Kramer, Dvorak, Genova & Traub

[57] ABSTRACT

This invention relates to the treatment of bakery products to be stored in the deep frozen state. Such products are deep frozen in an appropriate plant after the baking process and removed therefrom and thawed out for consumption.

According to the invention, before the deep freezing process, a material that maintains and/or increases the moisture content of the crumb is injected through the crust and into the crumb. The weight relationship of the injected material is 4 grams per 100 grams of the product.

4 Claims, No Drawings

TREATMENT OF BAKERY PRODUCTS TO BE STORED IN THE DEEP FROZEN STATE

BACKGROUND OF THE INVENTION

The present invention relates to the treatment of bakery products to be stored in the deep frozen state, of the kind in which the actual products are deep frozen in an appropriate plant after the baking process and removed from the plant and thawed out again for the purpose of preparation for consumption.

Bakery products have, as is known, the property that they are already considered to be "old baked" about 15 minutes after baking and after reaching a temperature of 40° to 50° C. In this so-called retrogradation process the starch, which has combined with the water from the dough during baking, releases this water again. Thus the original hard or brittle crust of the product becomes gradually softer and tougher so that after a certain time, the product no longer has the quality desired by the user.

As it is not always possible for the bakery to offer oven-fresh products for sale in sufficient amounts for understandable reasons, a practice that has been in use for many years consists in deep freezing the bakery products if possible directly after the baking process and storing them so that the products can be taken out of the cold storage plant again when needed and be sold after defrosting. It is thus a matter of products which are fresh in principle and not old-baked as the deep freezing process has prevented or interrupted the retrogradation process referred to above, since the water combined in the starch was frozen.

Practice shows that in this way bakery products of all types such as breads, rolls and other small bakery products as well as cakes can be left for a short or even for a longer storage period by deep freezing in the finished baked state, without basic disadvantages being expected in respect of the quality of the taste. To this extent therefore this stock pile method makes possible without further ado an opportune rationalization in manual and also in industrial bakeries.

Of course practice has shown that the deep freezing of water-containing bakery products especially, often has an unpleasant side effect in that the crust and the crumb separate from each other during the freezing process so that the product can no longer be offered for sale to the customers. Thus the bakeries are bound as much as ever to bake the rolls and breads affected by these disadvantages very early in the morning, also at night by partially disregarding any night baking prohibitions that may prevail locally and, finally, also several times during the day so as to always be able to offer their customers satisfactory wares.

The separation of the crust for example in deep frozen white bread or in water-containing rolls is a problem which has been known for a long time and up to now has not been capable of solution. This recurrence, i.e. the separation of crust and crumb which occurs on deep freezing, is traced back amongst other things to the fact that during freezing the volume decreases in the crumb in the one hand and the crust on the other hand were of different amounts whereby pressures arose in the crust and it separated from the crumb. Another explanation for this process is that pressures occur in the crust due to drying out by sublimation, whereby it is not so much the water-rich crumb part but rather the hygroscopic crust which drys out and therefore separates from the crumb part. For the rest, it is generally to be observed that this separation does not occur directly at the transition point between crumb and crust but normally in the layer of crumb lying directly under the crust, for which reason this separation process could also be due to the fact that primarily a drying out of the outer layer of the crumb causes a shrinking or crumbling of the crumb body whereby this pulls away from the essentially firm crust.

Independently of the reasons for the cause of this action when deep freezing bakery products, it is to be confirmed that up to now no solution could be found to avoid the problem. Amongst other things it has been tried to preserve bakery products by additives added to the dough. Fruit, kernel meal, emulsifier, modified starches, fat and the like have been used as such additives. It has also been attempted to store rolls or white bread directly after baking in a fermenting cupboard at a temperature of 30° to 35° C. and at a relative atmospheric moisture of about 90% for approximately one to two hours and then to freeze it afterwards. It is thus a matter of the so-called conditioning process.

The use of the said additives has up to now not given positive results in any case. The conditioning process, apart from considerable use of time and plant, has not been satisfactory as the crust is soft and tough after conditioning. In many cases of course no separation of the crust from the crumb has occurred. This advantage which also occurs temporarily is not of much use however, if the crust of the bakery product does not fulfill the requirements of the consumer.

It is an object of the invention to provide a method for preliminary treatment of bakery products to be stored in the deep frozen state, is a result of which upon final defrosting of the product, after the storage time, it has an especially good freshness and taste and, above all, on freezing or during storage in the deep frozen state, no separation of crust and crumb occurs.

SUMMARY OF THE INVENTION

Accordingly the invention consists in a method for the treatment of bakery products to be stored in the deep frozen state, of the kind in which said products are deep frozen after the baking process in a freezer plant and are removed from the plant and thawed out for the purposes of prepreparation for consumption, wherein before the deep freezing process, a material maintaining and/or increasing the moisture content of the crumb is injected through the crust into the crumb.

The injected material may be selected from the group consisting of water, water vapor, steam and a hygroscopic medium.

Practical experiments using this method for rolls and bread have resulted in that neither at the initial deep freezing process and the cold shock thus occurring, nor during a storage of the bakery products in the deep freeze plant for several weeks does a division or a separation of the crust from the crumb occur. The same is also correspondingly true for the defrosted product which beyond that still makes a good impression and is fresh and tasty compared with the traditionally processed bakery wares which are also stored in the frozen state.

These advantages are to be traced back amongst other things to the fact that, for example, after injection of, say, steam into the crumb the latter becomes so enriched or indeed saturated with mositure that a certain surplus water content is present which, despite longer storage time of the product and despite the moisture losses which thus naturally occur, ensures that the minimum moisture content otherwise leading to stresses between crust and crumb is never attained and therefore that the actual moisture content is always at a higher level.

The properties of the crust are not disadvantageously influenced by injection of water, steam or a hygroscopic medium as occurs with conditioning as referred to above, since the injection is not made into the crust but directly into the crumb.

In bringing the invention into effect, advantageously the base or the base crust of the bakery product is simultaneously pierced with several injecting needles or hypodermic syringes and steam for example is inserted at appropriate pressure into the crumb via the inserted needles and is there dispersed for increase of the moisture content remaining in the crumb body after the baking process. Simultaneously working with several injection needles is advantageous for fast operation and an even distribution of moisture. On the other hand of course, it would be possible to use only a single needle, if this should be found to be desirable for operational reasons.

This "innoculation" of the crumb could also be carried out without using a needle by shooting the material concerned in pulse-like manner through the crust into the crumb and, indeed, for example according to the principle known from medical technology utilising injection nozzles at correspondingly high pressures. Experiments with this injection method have shown up to now that it is indeed basically useable but that the amount of material to be inserted in one operation is limited and that the plant necessary for this is quite complicated and expensive.

Therefore, although innoculation of the crumb without a needle is not excluded, it has proved easier and more effective to operate with injection needles or hypodermic syringes up to now, particularly since the necessary amounts of material can be injected in a short time continuously by needles. In practicing the invention for example with water containing bakery products such as rolls or white bread, water or steam should be injected at a weight of 4 grams per 100 grams of completely baked bakery product and this is easily obtained by the simultaneous use of several injection needles in one operation particularly since these needles can always be supplied with sufficient steam or water vapor via corresponding connections.

Finally it is to be pointed out that in addition to or apart from the material for increasing the moisture content, materials binding and retaining the moisture content such as for example dextrose can also be used for the same purpose. The same obviously goes for other materials and liquids or solutions such as extracts emulsions, sorbite and glycerine.

I claim:

1. In a method for the treatment of baking products to be stored in the deep-frozen state, of the type which have a crust covering the inner crumb, which crust separates from the crumb during deep-frozen storage, and in which, after the baking process, the products are deep-frozen in a freezer plant, and are later removed from the plant and thawed for consumption purposes, the improvement comprising injecting a material, selected from the group consisting of water, water vapor and steam, into the products prior to the deep-freezing step in order to prevent a separation of crust and crumb during the storage of the products, the material being injected through the crust into the crumb, at a weight of approximately 4 grams per 100 grams of completely baked bakery products.

2. A method according to claim 1, in which the injected material is water vapor.

3. A method according to claim 1, wherein the base of the bakery products and a connected part of the crumb are pierced by means of an injection needle by which said material is injected into the crumb.

4. A method according to claim 1, wherein the injection is effected by spraying nozzles.

* * * * *